(12) United States Patent
Komatsu (10) Patent No.: US 12,110,929 B2
(45) Date of Patent: Oct. 8, 2024

(54) ROTARY POWER TRANSMISSION DEVICE WITH ACTUATOR RETENTION FEATURE

(71) Applicant: GKN Automotive Limited, Birmingham (GB)

(72) Inventor: Toshiaki Komatsu, Commerce Township, MI (US)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/179,282

(22) Filed: Mar. 6, 2023

(65) Prior Publication Data

US 2023/0296141 A1 Sep. 21, 2023

Related U.S. Application Data (60) Provisional application No. 63/320,013, filed on Mar. 15, 2022.

(51) Int. Cl.
| | | |
|---|---|---|
| *F16D 27/118* | (2006.01) | |
| *B60K 17/346* | (2006.01) | |
| *B60K 23/08* | (2006.01) | |

(52) U.S. Cl.
CPC .......... *F16D 27/118* (2013.01); *B60K 17/346* (2013.01); *B60K 2023/0858* (2013.01)

(58) Field of Classification Search
CPC ... F16D 27/118; F16D 27/14; F16D 2027/008
See application file for complete search history.

(56) References Cited

U.S. PATENT DOCUMENTS

| | | | |
|---|---|---|---|
| 7,247,118 B2 | 7/2007 | Haruki et al. | |
| 9,396,860 B1* | 7/2016 | Wright | F16D 27/118 |
| 9,422,988 B2 | 8/2016 | Beesley et al. | |
| 10,190,667 B2 | 1/2019 | Onitake et al. | |
| 2007/0054771 A1 | 3/2007 | Fusegi | |
| 2014/0004988 A1 | 1/2014 | Yamanaka et al. | |
| 2017/0159726 A1* | 6/2017 | Creech | F16D 11/14 |
| 2017/0198801 A1* | 7/2017 | Onitake | F16H 48/24 |
| 2017/0297428 A1* | 10/2017 | Inose | F16D 27/112 |
| 2018/0306297 A1* | 10/2018 | Komatsu | B22D 19/04 |
| 2019/0078676 A1* | 3/2019 | Komatsu | H01F 7/16 |

FOREIGN PATENT DOCUMENTS

| | | |
|---|---|---|
| JP | 2018059606 A | 4/2018 |
| WO | WO2016035129 A1 | 3/2016 |

* cited by examiner

*Primary Examiner* — Huan Le
*Assistant Examiner* — Aimee Tran Nguyen
(74) *Attorney, Agent, or Firm* — Reising Ethington P.C.

(57) ABSTRACT

A rotary power transmission device includes a housing, a clutch, an actuator and a retaining body. The housing has an annular surface and an interior in which multiple components are received for rotation. The clutch is received within the housing and has a clutch ring selectively engageable with one of said multiple components. The actuator has a limit surface, a coil and a plunger driven for movement along an axis and relative to the clutch, and the plunger is received over and movable along the annular surface. The retaining body has a blocking surface radially overlapped with the limit surface and arranged to be contacted by the limit surface to prevent removal of the plunger from the annular surface.

17 Claims, 6 Drawing Sheets

ROTARY POWER TRANSMISSION DEVICE WITH ACTUATOR RETENTION FEATURE

REFERENCE TO RELATED APPLICATIONS

This application claims the benefit of U.S. Provisional Application Ser. No. 63/320,013 filed on Mar. 15, 2022 the entire content of which is incorporated herein by reference in its entirety.

TECHNICAL FIELD

The present disclosure relates generally to rotary power transmission device having an actuator and a retention feature for at least part of the actuator.

BACKGROUND

Electromagnetic actuators having an annular plunger slidably displaced by an electromagnetic field generated by the actuator may be used to actuate a device. Separate retaining devices are used to maintain an assembled position of the plunger and the retaining devices are located outboard of the plunger and increase the size and complexity of the device, require adjacent components to be located outboard of the retaining device and require additional parts and labor to assembly the device.

SUMMARY

In at least some implementations, a rotary power transmission device includes a housing, a clutch, an actuator and a retaining body. The housing has an annular surface and an interior in which multiple components are received for rotation. The clutch is received within the housing and has a clutch ring selectively engageable with one of said multiple components. The actuator has a limit surface, a coil and a plunger driven for movement along an axis and relative to the clutch, and the plunger is received over and movable along the annular surface. The retaining body has a blocking surface radially overlapped with the limit surface and arranged to be contacted by the limit surface to prevent removal of the plunger from the annular surface.

In at least some implementations, the coil is received within a coil housing and the blocking surface is defined by a surface of the coil housing. In at least some implementations, the blocking surface is defined by a radially inwardly extending projection of the coil housing. In at least some implementations, the projection is axially overlapped by the coil. In at least some implementations, the projection is axially offset from the coil. In at least some implementations, the blocking surface is located radially inwardly of the coil. In at least some implementations, the blocking surface defines a radially inwardmost surface of the coil housing.

In at least some implementations, the retaining body is carried by and extends radially outward of the annular surface. In at least some implementations, the housing includes a groove extending radially inwardly from the annular surface, and the retaining body is an at least partially annular body that is partially received within the groove and extends out of the groove radially beyond the annular surface.

In at least some implementations, the plunger has a first position in which the clutch ring is not engaged with said one of the multiple components, and the plunger has a second position in which the clutch ring is engaged with said one of the multiple components. In this arrangement, engagement of the limit surface with the blocking surface limits movement of the plunger in a direction in which the plunger moves away from the second position.

In at least some implementations, the plunger includes a first body and a second body that are coupled together, the second body includes a radially inner surface that slides along the annular surface as the plunger moves along the annular surface and a portion of the second body is received radially between the first body and the annular surface, and the limit surface is defined by the second body.

In at least some implementations, the plunger includes a first body and a second body that are coupled together, the second body includes a radially inner surface that slides along the annular surface as the plunger moves along the annular surface and a portion of the second body is received radially between the first body and the annular surface, and the limit surface is defined by the first body at a rear end of the plunger that is opposite to a front end of the plunger wherein the front end of the plunger is engageable with the clutch ring.

In at least some implementations, a rotary power transmission device includes a housing, a clutch, an actuator and a retaining body. The housing has an annular surface and an interior in which multiple components are received for rotation. The clutch is received within the housing and has a clutch ring selectively engageable with one of said multiple components. The actuator has an annular wire coil and a plunger driven for movement along an axis and relative to the clutch. The plunger is received over and movable along the annular surface between a first position in which the clutch ring is not engaged with said one of said multiple components and a second position in which the clutch ring is engaged with said one of said multiple components. And the plunger has a radially extending limit surface. The retaining body has a blocking surface radially overlapped with the limit surface and arranged to be contacted by the limit surface when the plunger is in the first position.

In at least some implementations, the wire coil is received within a coil housing and the blocking surface is defined by a surface of the coil housing. In at least some implementations, the blocking surface defines a radially inwardmost surface of the coil housing.

In at least some implementations, a groove is provided that extending radially inwardly from the annular surface, and the retaining body is an at least partially annular body that is partially received within the groove and extends out of the groove radially beyond the annular surface.

BRIEF DESCRIPTION OF THE DRAWINGS

The following detailed description of preferred embodiments and best mode will be set forth with reference to the accompanying drawings, in which.

DETAILED DESCRIPTION

Figure 1:
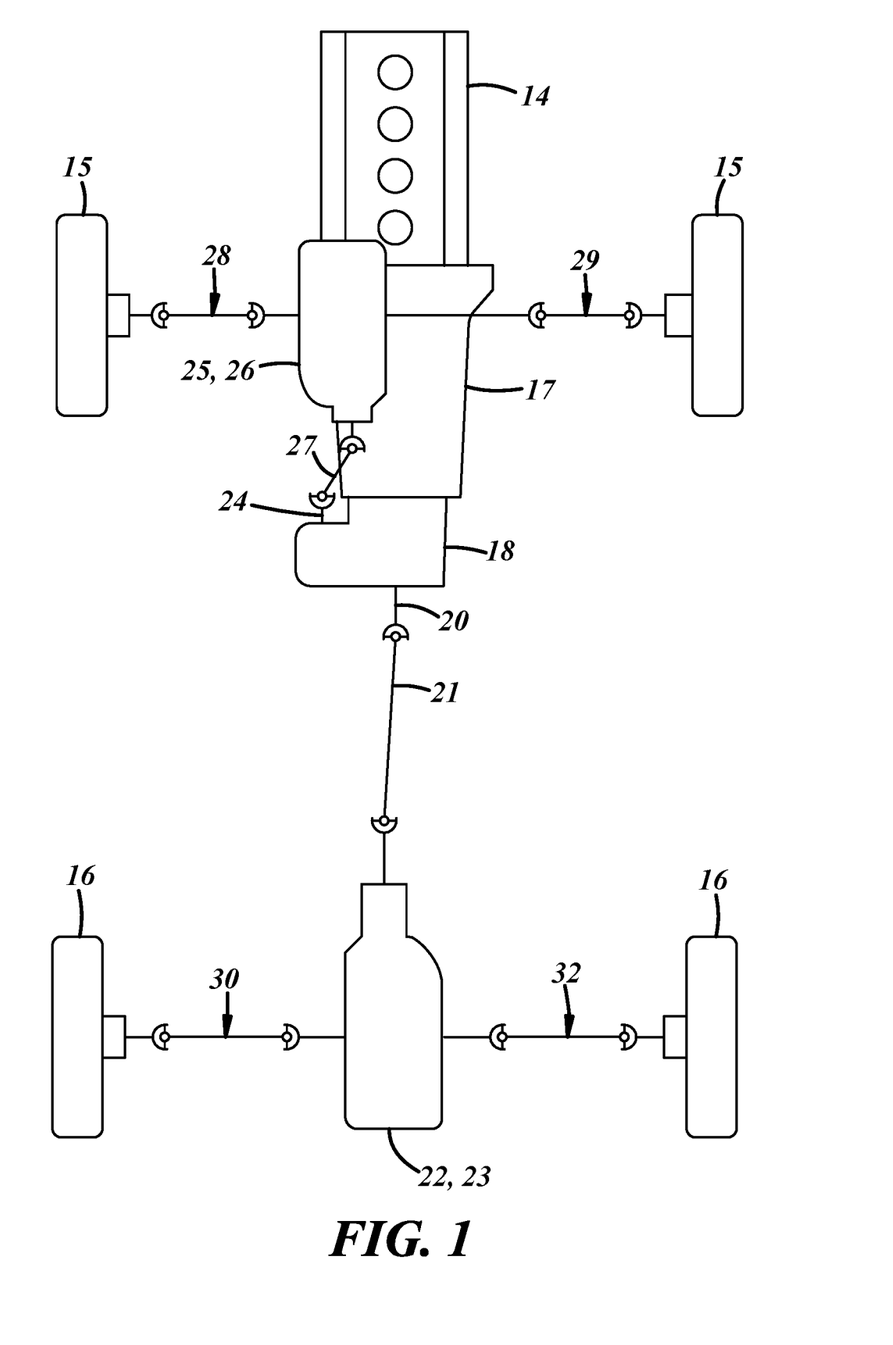
FIG. 1 is a schematic diagram of a vehicle driveline assembly.

Referring in more detail to the drawings, FIG. 1 illustrates a vehicle driveline 12 that provides power from an engine 14 to multiple wheels including front wheels 15 and rear wheels 16. The engine 14 supplies torque via a transmission 17 and a power transfer unit 18 that provides an output shaft 20. The output shaft 20 is coupled to a first prop shaft 21 which is coupled to a rear drive unit 22 that may include a differential assembly 23. The power transfer unit 18 or other device may have an output shaft 24 coupled to a front drive unit 25 (which may include a differential assembly 26) via a second prop shaft 27. Front left and right side shafts 28, 29 are coupled to the drive unit/differential 25, 26 which permits relative rotation between the side shafts 28, 29 and front wheels 15. Rear left and right side shafts 30, 32 are coupled to the rear drive unit/differential 22, 23 which permits relative rotation between the side shafts 30, 32 and rear wheels 16. The power transfer unit 18 may include a disconnect assembly that, when in a connected state, transfers torque to the second prop shaft 27 to drive the front wheels 15. When connected or disconnected, the power transfer unit 18 may provide torque to the first prop shaft 21 to drive the rear wheels 16. Thus, depending upon the state of the disconnect device, the driveline 12 may provide torque to the rear wheels 16 only or to all four of the wheels 15, 16.

Of course, other driveline configurations may be used, as desired. For example, while shown in rear drive based driveline, lockup differentials can also be used in front based all-wheel drive system, or even in two-wheel drive front engine/front wheel drive or front engine/rear wheel drive drivetrains, as well as in an e-axle (e-motor driven final drive unit).

Figure 2:
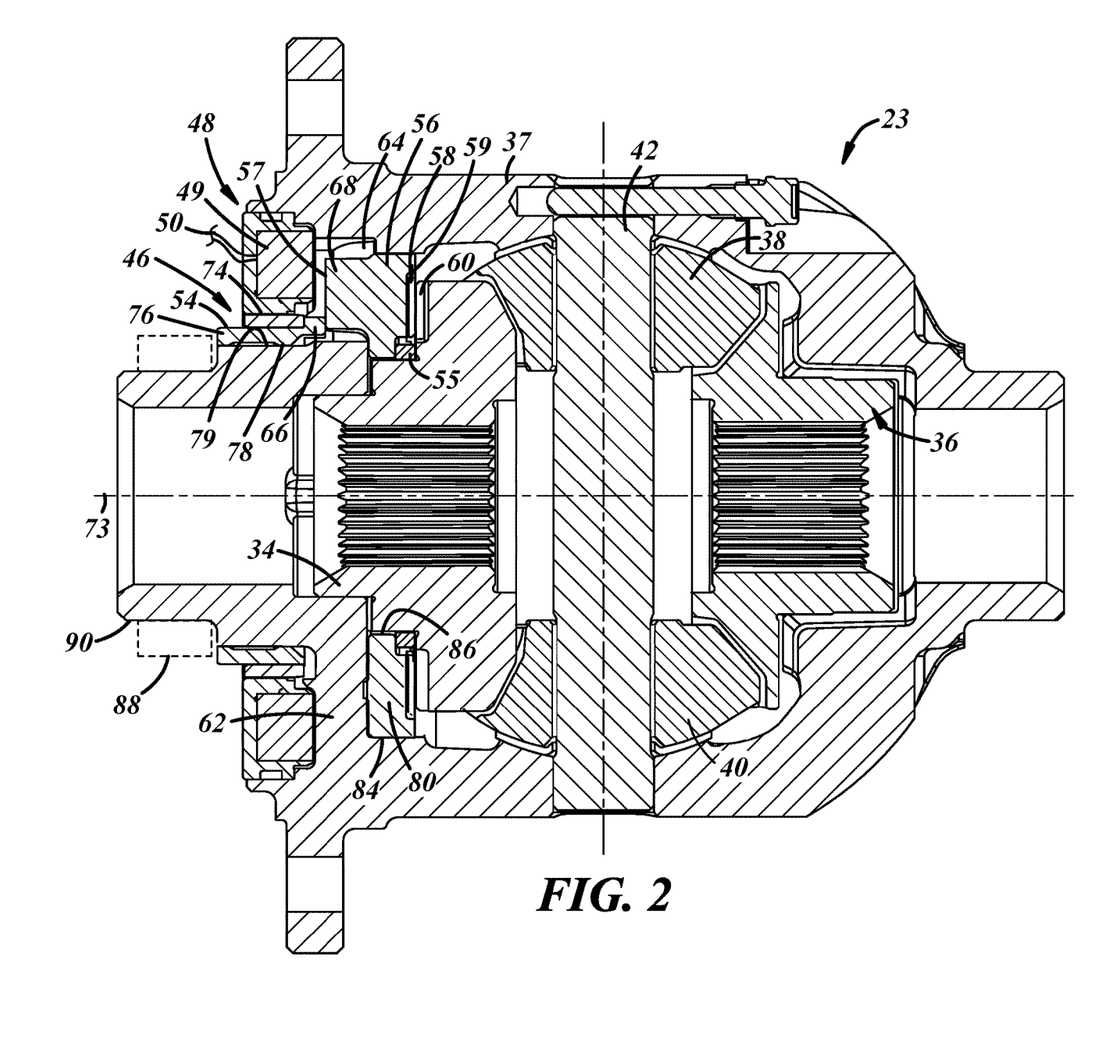
FIG. 2 is a cross-sectional view of a differential with an electrically actuated clutch, wherein the differential is shown in an open position.

Referring now to FIG. 2, the first rear side shaft 30 is connected to a first side gear 34 within the differential 23. Similarly, the second rear side shaft 32 is connected to a second side gear 36 within the differential 23. The side gears 34, 36 are carried within a housing 37 of the differential 23. The differential also includes pinion gears 38, 40 that are meshed with side gears 34, 36, respectively, and which are mounted within the housing 37 on a pinion shaft 42.

To selectively lock and unlock the differential 23 a clutch assembly 46 is provided. The clutch assembly 46 may have actuated and deactuated states, and in one state the clutch assembly couples one of the side shafts (e.g. 32) to the differential housing 37 so that the coupled side shaft rotates with the housing. This, in turn, causes the other side shaft 30 to rotate in unison with the housing 37 and the side shaft 32 coupled to the housing so that both side shafts 30, 32 rotate at the same speed.

In at least some implementations, the clutch assembly 46 is electrically actuated and includes an actuator having a solenoid 48 with an annular wire coil 49 and a drive member that may include an armature or plunger 54 received at least partially radially inwardly of and axially overlapped with the coil. In at least some implementations, the plunger 54 is also annular, the plunger and coil 49 are coaxially arranged and carried by the housing 37 for rotation with the housing, and one side shaft (here, the second side shaft 32) extends coaxially through a portion of the housing 37 that extends through the coil and plunger. Electric power is supplied to the coil 49 via a power wire 50 to generate a magnetic field that displaces the plunger 54 relative to the coil and differential housing 37 from a first or retracted position to a second or advanced position. To facilitate return of the plunger 54 from the second position back to the first position when power is not provided to the coil 49, a biasing member, such as a spring 55 may act on the plunger 54, or on a component engaged with the plunger, as set forth below. In at least some implementations, the clutch assembly 46 is actuated when the plunger 54 is in the second position and the clutch assembly is deactuated when the plunger is in the first position. While in the example shown the plunger 54 is in its second position when power is provided to the coil 49 and the plunger moves to the first position when power is not supplied to the coil, the opposite could be true if desired (e.g. the clutch assembly 46 could be moved to the actuated position by the biasing member 55 and deactuated by powering the coil).

In at least some implementations, the clutch assembly 46 may further include or be associated with a clutch member, called herein a clutch ring 56 adapted to be driven by the plunger 54 and to interface with the side gear 34 as set forth below. The clutch ring 56 may be annular and a portion of the second side gear 36 and/or shaft 32 may extend through the clutch ring. The clutch ring 56 may include a rear face 57 engageable by the plunger 54 and a front face 59 having at least one engagement feature 58, such as gear or clutch teeth 58 (e.g. dog clutch teeth) configured to engage a corresponding engagement feature 60 (e.g. gear or dog clutch teeth) formed on a rear face of the first side gear 34. The spring 55 may act on the clutch ring 56 to urge the clutch ring into the plunger 54 and move the plunger to its first position when the coil 49 is not powered, as noted above. In the implementation shown, the plunger 54 is located adjacent to one side of a housing wall 62 and the clutch ring 56 is located adjacent to the other side of the wall 62. The wall 62 includes apertures 64, and the plunger 54 and clutch ring 56 include axially extending feet 66, 68, respectively, that extend into or through the apertures 64 in the wall so that the plunger and clutch ring are engaged with each other across or through the wall. Like the coil 49 and plunger 54, the clutch ring 56 also is carried by and rotates with the housing 37.

The differential 23 illustrated in FIG. 2 is shown in an open mode or position. In the illustrated implementation, in the open position of the differential, the coil 49 is not powered, the plunger 54 is in its first position and the clutch ring 56 is not engaged with the side gear 34 so that the side gear can rotate relative to the clutch ring 56 and housing 37. In the open position, the side shafts 30, 32 may rotate at different speeds from one another. However, certain driving conditions may make it desirable for the side shafts 30, 32 to rotate in unison such that torque is applied to both wheels.

In the locked position, the coil 49 is powered, the plunger 54 is advanced to its second position which drives the clutch ring 56 into engagement with the side gear 34 (i.e. teeth 58 engage and mesh with teeth 60). Hence, the side gear 34 is coupled to the housing 37 so that the side gear rotates with and not relative to the housing. In effect, the second side shaft 32 is locked to and rotates with the housing 37, which in turn forces the first side shaft 30 and the second side shaft 32 to rotate in unison.

As shown in FIGS. 2-6 and 9-10, the plunger 54 may be formed from multiple materials including a material that is magnetically responsive to the magnetic field generated by the coil 49, and at least one other material that may or might not be responsive to the magnetic field. Thus, when the magnetic field is generated by the coil 49, the plunger 54 may be driven from one position to another (e.g. from the retracted to the advanced position). As used herein, a material is responsive to a magnetic field if a magnetic field of the magnitude generated by a solenoid 48 of the type used in applications such as that described herein, may cause a component formed of or including such material to be displaced.

Figure 3:
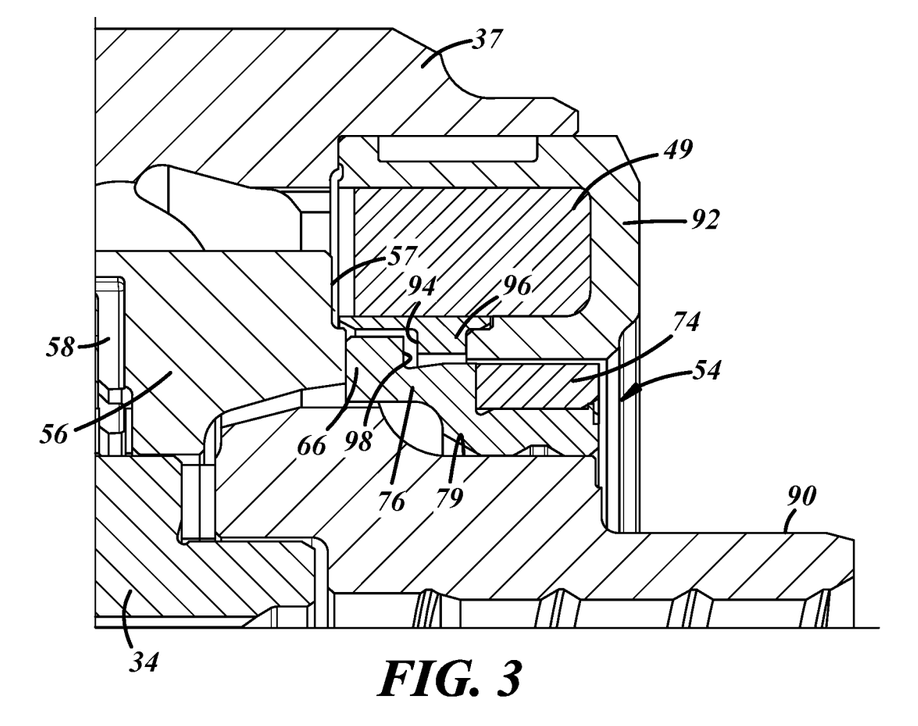
FIG. 3 is a fragmentary sectional view of a portion of the clutch showing an actuator having a plunger and a solenoid coil.

In at least some implementations, as shown in FIGS. 2 and 3, the plunger 54 includes a main body with a central axis 73 and which may be defined by a first body 74 and a second body 76 that are coupled together and move as one unit or component and are not separated during use. The first body 74 may be formed from a magnetically responsive material and may be received adjacent to and radially inwardly of the coil 49, with a small air gap between them. The second body 76 may have at least a portion that is radially inward of at least a portion of the first body 74. The second body 76 may be annular and may, in at least some implementations, radially overlap part of the first body 74. The second body 76 may be conveniently overmolded onto the first body 74 to facilitate forming the second body and connecting together the first and second bodies, however other forming processes such as but not limited to casting, stamping or extruding may be used. The second body 76 may define part or all of the feet 66 of the plunger 54 which may extend axially beyond the first body 74, if desired. The second body 76 may be formed from a material that is not magnetically responsive (e.g. plastic, aluminum, stainless steel, etc.), and may provide a magnetic flux shield of sorts that improves the magnetic field strength on or in the area of the first body 74 to ensure proper response of the plunger 54 when the coil 49 is energized. In this way, the magnetic field is more concentrated or stronger in the area of the first body 74 to increase the magnetic flux at or in the first body and improve the responsiveness of the plunger 54 to the generated magnetic field.

Figure 4:
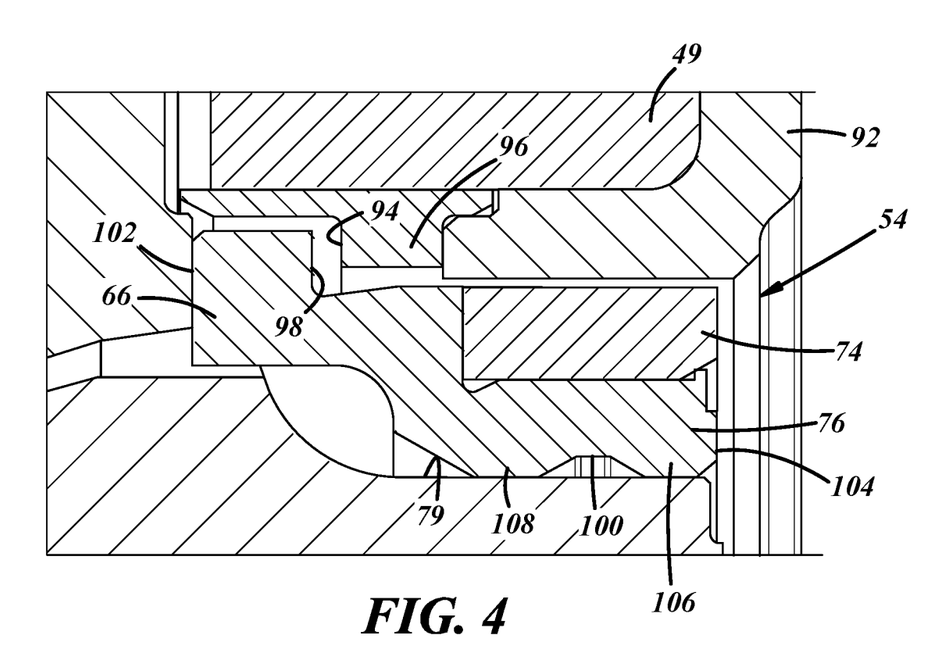
FIG. 4 is an enlarged fragmentary sectional view of a portion of FIG. 3.

As shown in FIGS. 3 and 4, the second body 76 may have an inner surface 78 that is received adjacent to or around a surface 79 of the differential housing 37. The inner surface 78 may define a pilot diameter for receipt of the plunger 54 over the annular surface 79 of the differential housing 37 for guided linear, axial movement of the plunger relative to the differential housing.

Referring to FIG. 2, the clutch ring 56 has a main body 80 with a central axis that may be coaxial with the axis 73 of the plunger 54, a radially outer surface 84 that extends axially between the rear face 57 and the front face 59, and a radially inner surface 86 that may have a lesser axial extent than the outer surface 84. The inner surface 86 of the clutch ring 56 may be received around a surface of the side gear 34. The feet 68 of the clutch ring 56 define part of the rear face 57, are circumferentially spaced apart and extend axially from other portions of the rear face 57. The teeth 58 are located on the front face 59. The clutch ring 56 may be made from metal, such as alloy steel, chromium steel, chromium molybdenum steel, nickel steel, nickel chromium molybdenum steel, mid/high carbon steel, etc.

In use of the differential 23, a bearing 88 is mounted on an exterior surface of a tubular portion 90 of the housing 37. In FIG. 2, the bearing 88 is shown in diagrammatic form as a broken line polygon, and may include an inner race having an inner surface on a tubular outer surface of the tubular portion, and an outer race received over the inner race. Suitable bearings are known in the art. As is shown in FIG. 2, the bearing 88 extends radially beyond the surface 79 along with the plunger 54 slides in use. The plunger 54 is prevented from sliding off the housing 37 by engagement with the bearing 88.

In at least some applications, the differential 23 may be assembled to the general state shown in FIG. 3, with the clutch ring 56, plunger 54, and coil 49 in position on the housing 37, but without the bearing 88 installed. The bearing 88 would then be installed later. In this condition, the plunger 54 is not overlapped or stopped from sliding off the surface 79) by the bearing 88, and without a different retention feature, the plunger 54 may slide off surface 79 and become disconnected from the housing 37.

In the implementation shown in FIG. 3, the coil 49 is received within a housing 92, which may be made from any suitable material such as various plastics. The housing 92 may be formed from more than one piece to facilitate assembly of the coil 49 into the housing 92, the housing may be molded over the coil, and the housing may be annular and may completely enclose the coil, if desired. In at least some implementations, the housing 92 includes or carries a plunger retention feature that prevents the plunger from sliding off surface 79 when the coil 49 and plunger 54 are installed on the differential housing 37. In the example shown in FIGS. 3 and 4, the retention feature is a body or portion of a body defining a blocking surface 94 that is engaged by the plunger 54 to limit movement of the plunger in a direction away from the clutch ring, to prevent the plunger from sliding off the surface 79 and being disconnected from the housing 37. In the example of FIGS. 3 and 4, the retaining body is the housing 92 and the blocking surface 94 is defined by a projection 96 that extends radially inward toward the plunger 54 and which is in the path of movement of a portion of the plunger 54. In at least some implementations, the projection 96 is axially aligned with and overlapped by the coil 49 and plunger 54, with the coil 49 radially outward of the projection 96. The projection 96 may define a radially inward most portion of the housing 92, in at least some implementations.

In the example shown, the plunger 54 includes a limit surface 98 that extends radially outward to an extent that a portion is radially overlapped by the blocking surface 94. In the example shown, the limit surface 98 is defined by a portion of the finger 66 of the plunger 54, which is a portion of the second body 76 of the plunger 54 in this example.

In at least some implementations, the radially inner surface 78 of the plunger 54 that slides along the surface 79 of the housing 37 includes an optional groove 100 in which oil may be received or which otherwise reduces the axial extent of the inner surface 78 that frictionally engages the housing surface 79, to facilitate sliding movement of the plunger 54 relative to the housing surface 79. The groove 100 when provided may be between opposed front and rear ends 102, 104 of the plunger 54 and defines a first annular pilot ring 106 at or near the rear end 104 of the plunger 54, and a second annular pilot ring 108 axially spaced from the first pilot ring 106 and with the groove 100 between them. The first pilot ring 106 has an axial dimension, and the blocking surface 94 and limit surface 98 may be arranged so that the limit surface 98 contacts the blocking surface 94 while at least a portion of the first pilot ring 106 remains overlapped with the housing surface 79. That is, the surfaces 94, 98 are in contact with each other before the first pilot ring 106 is removed from the surface 79. In at least some implementations, when a plunger foot 66 is in contact with the clutch ring 56, a distance between the limit surface 98 and blocking surface 94 is less than the axial dimension of the first pilot ring.

The radially overlapped limit surface 98 of the plunger 54 and blocking surface 94 of the coil housing 92 can retain the plunger 54 in a desired assembled position, even without a bearing 88 or other component needed to limit movement of the plunger 54. For example, a separate retaining ring or washer is not needed to be installed on the housing 37 to temporarily retain the plunger 54 until the bearing 88 is installed. Due to the radially overlapped surfaces 94, 98, the plunger 54 cannot be installed on the housing 37 after the coil 49 is installed on the housing 37. Instead, the plunger 54 in this example is installed onto the housing surface 79 before the coil 49 is installed onto the housing 37, or the plunger 54 is installed into the coil 49 first and then both the plunger 54 and coil 49 are positioned on the housing 37 together.

Figure 5:
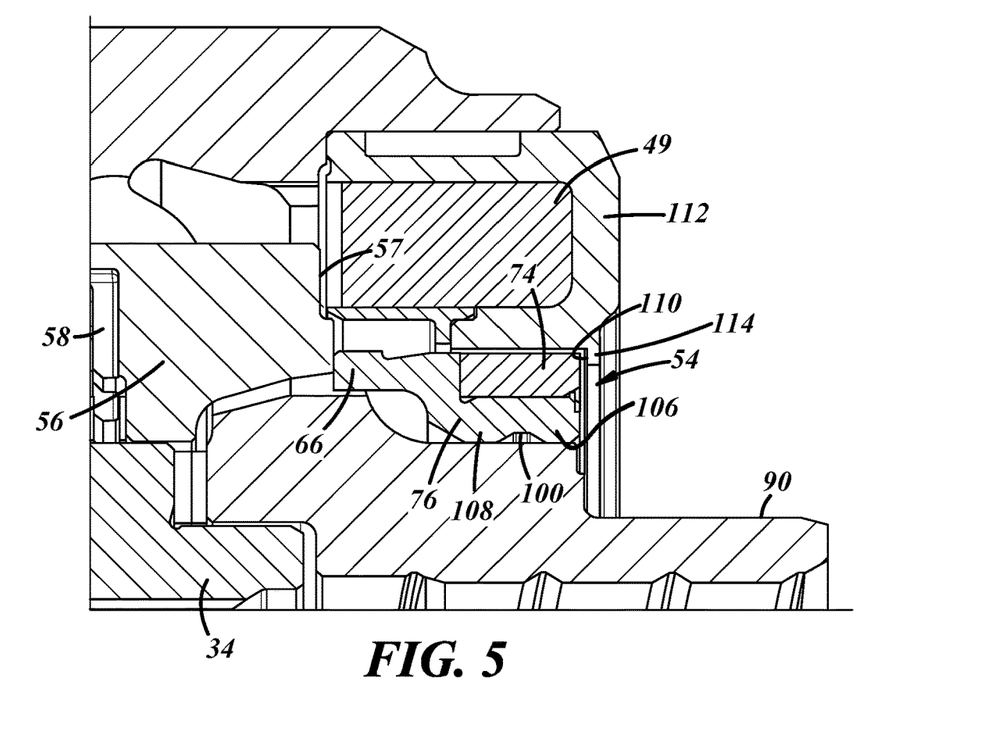
FIG. 5 is a fragmentary sectional view of a portion of the clutch showing a plunger and a coil.
Figure 6:
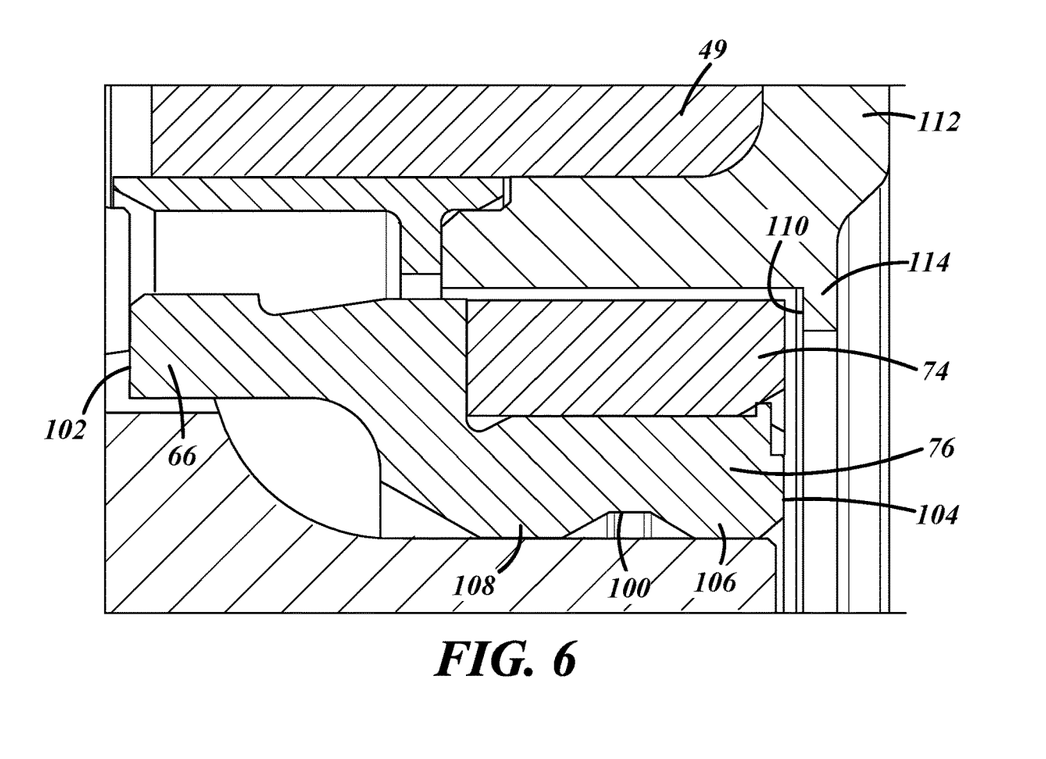
FIG. 6 is an enlarged fragmentary sectional view of a portion of FIG. 5.
Figure 7:
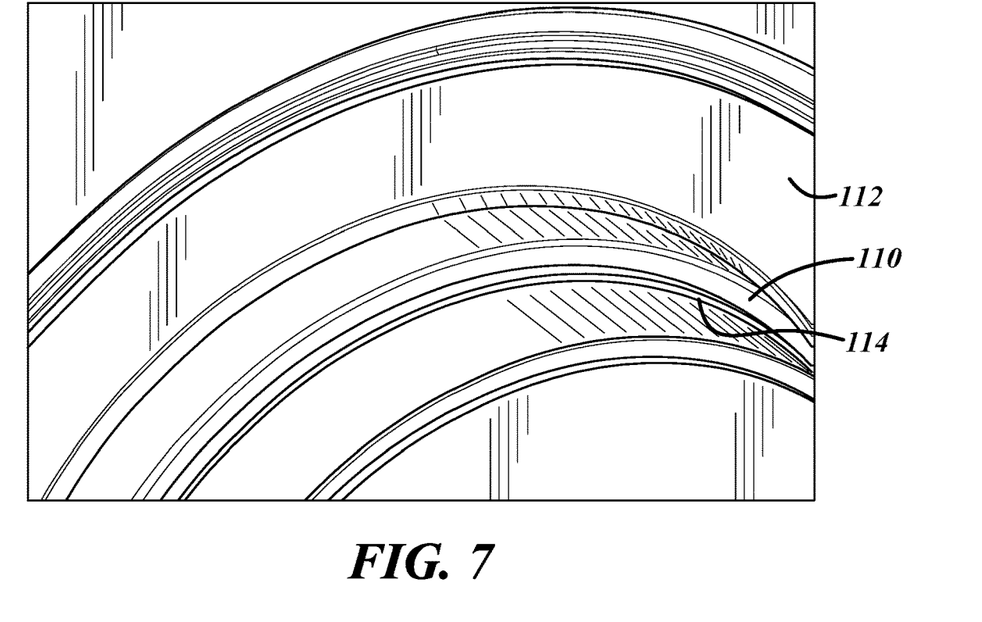
FIG. 7 is a fragmentary perspective view of a portion of a housing for a solenoid coil of the actuator that includes a retention feature.

FIGS. 5-7 relate to a differential that may be constructed and arranged similar to the differential 23 described above with regard to FIGS. 2-4, with difference noted herein. To facilitate description of this embodiment, the same reference numbers will be used for the same components already described, and the above description is incorporated herein. In this implementation, a blocking surface 110 of a solenoid coil housing 112 is defined by an inwardly extending projection 114 that is axially offset or outboard from and is not overlapped by the coil 49. This projection 114 may be arranged to engage a portion of the rear end 104 of the plunger 54, where the rear end may be considered to define a limit surface. The projection 114 may define a radially inward most portion of the housing 112, in at least some implementations. In the example shown, a portion of the rear end 104 including part of the first body 74 of the plunger 54 is radially overlapped by the blocking surface 110, although other embodiments may be used. For example, part of the rear end 104 of the second body 76 may also be overlapped by the blocking surface 110. With the projection 114 offset axially from the coil 49, less housing material is radially between the coil 49 and plunger 54 which means there is less material at reduce or attenuate the magnetic field used to drive the plunger. This may improve the performance of the actuator.

The plunger 54 may be otherwise constructed as previously described, with the exception that no limit surface (like limit surface 98 of the prior embodiment) needs to be provided that extends radially beyond the outer diameter of the first body 76, at or near the finger 66 or otherwise. In at least some implementations, when the plunger 54 is in contact with the clutch ring 56, a distance between the limit surface, which is the rear end 104, and blocking surface 110 may be less than the axial dimension of the first pilot ring 106, or otherwise arranged to prevent the first pilot ring 106 from moving axially off the housing surface 79.

The radially overlapped limit surface of the plunger 54 (e.g. part of the rear end 104) and blocking surface 110 of the coil housing 112 can retain the plunger 54 in a desired assembled position, even without a bearing 88 or other component needed to limit movement of the plunger 54. For example, a separate retaining ring or washer is not needed to be installed on the housing to retain the plunger 54 until the bearing 88 is installed. Due to the radially overlapped surfaces 104, 110, the plunger 54 cannot be installed on the housing 37 after the coil 49 is installed on the housing 37. Instead, the plunger 54 in this example is installed onto the housing surface 79 before the coil 49 is installed onto the housing 37, or the plunger 54 is installed into the coil 49 first and then both the plunger 54 and coil 49 are positioned on the housing 37 together.

Figure 8:
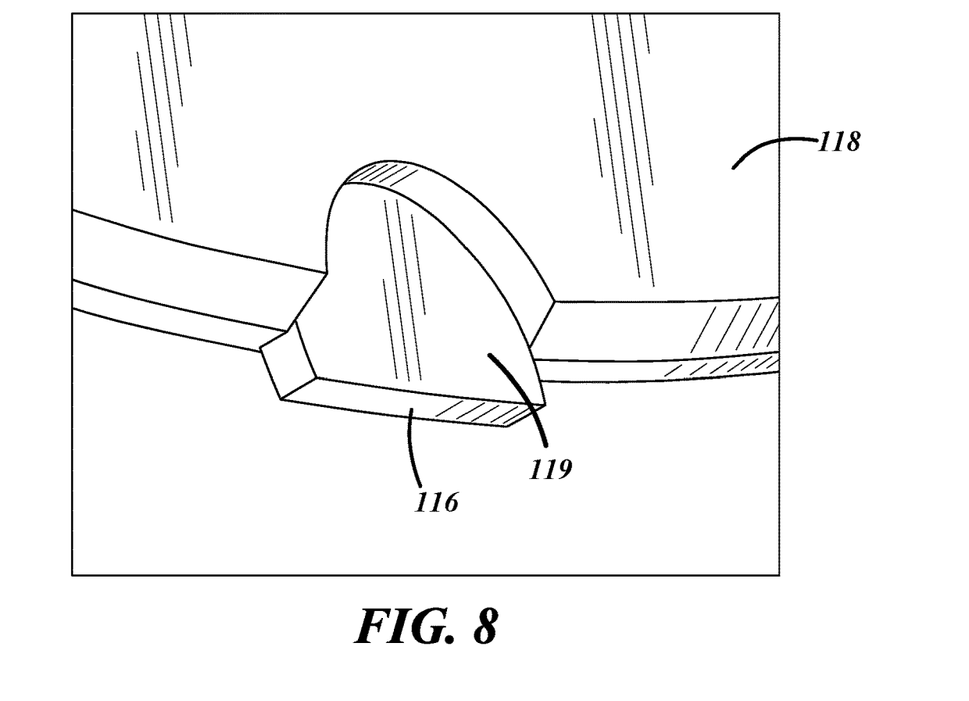
FIG. 8 is a fragmentary perspective view of a portion of the housing including an alternate retention feature.

FIG. 8 shows an implementation wherein a radially inward projection 116 of the housing 118 is not annular and is instead a discrete projection having a limited circumferential extent. To facilitate description of this embodiment, the same reference numbers will be used for the same components already described, and the above description is incorporated herein. Several such discrete projections 116 may be provided spaced apart on the housing 118, one or more and up to all of which provide a blocking surface 119 arranged to engage circumferentially spaced apart portions of the plunger 54 (e.g. limit surfaces on the plunger, such as portions of the rear end 104), to retain the plunger 54 on the housing 37 as described above. The discrete projections 116 can be provided as features provided when the coil housing 118 is formed, or by deforming the coil housing 118 by crimping, staking or the like after the coil housing 118 has been otherwise formed.

Figure 9:
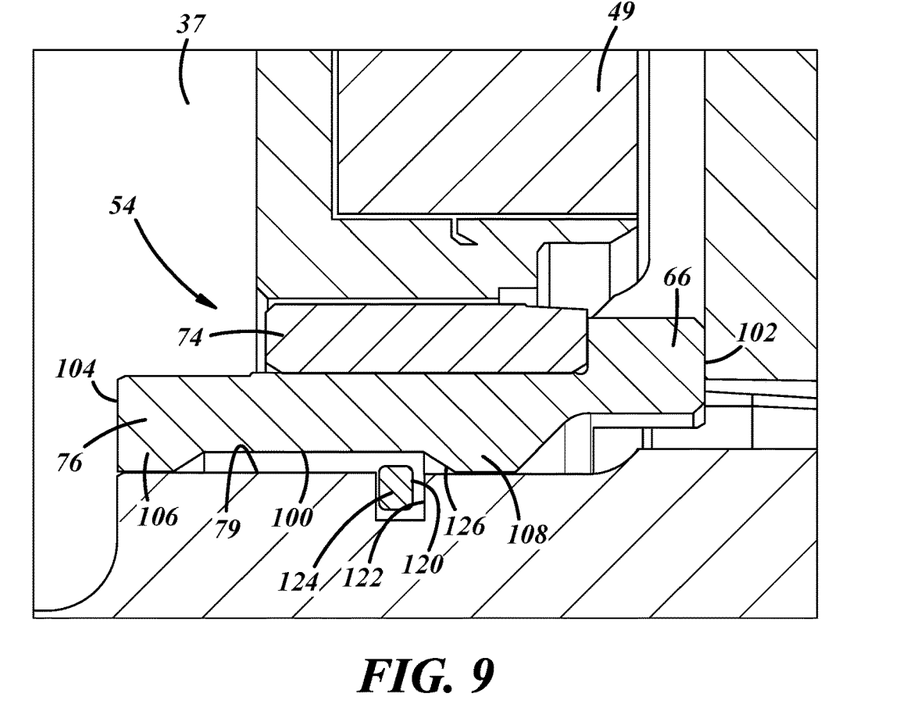
FIG. 9 is a fragmentary sectional view of a portion of the clutch showing a plunger, a coil and a plunger retaining feature.
Figure 10:
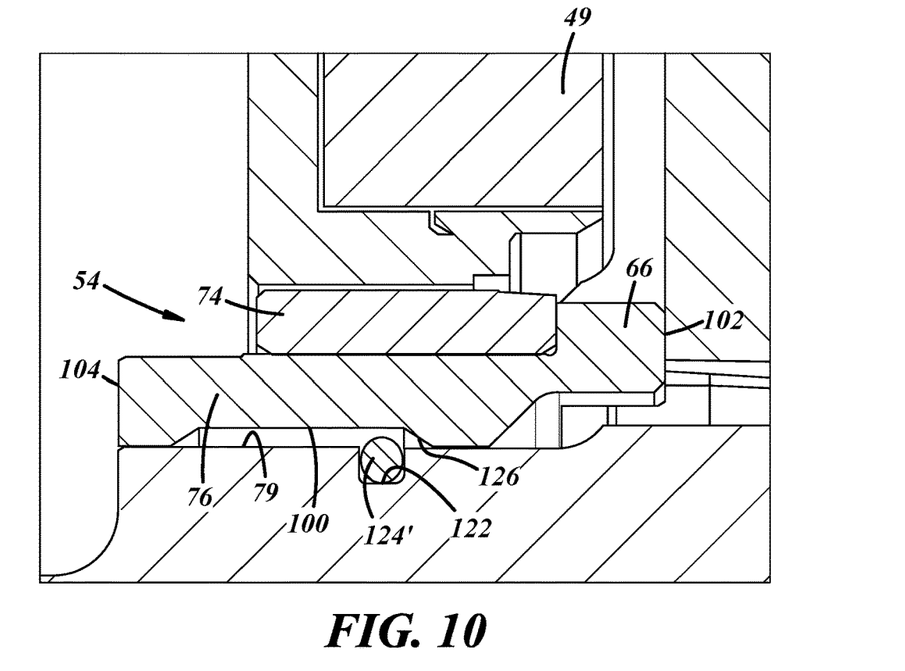
FIG. 10 is an enlarged fragmentary sectional view of a portion of FIG. 9 with a different retaining feature.

FIGS. 9 and 10 illustrate implementations wherein the plunger retaining feature is defined by a blocking surface 120 that extends radially outwardly from the housing surface 79 over which the plunger 54 moves in use. To facilitate description of this embodiment, the same reference numbers will be used for the same components already described, and the above description is incorporated herein. The differential housing 37 includes a channel or groove 122 that may extend annularly and radially inwardly from the surface 79, and a retaining body 124 may be provided within the groove 122. A portion of the retaining body 124 extends radially outwardly beyond the housing surface 79 and defines the blocking surface 120 that is in the path of and arranged to be contacted by part of the plunger 54 to retain the assembled position of the plunger 54. In assembly, the retaining body 124 is located axially between the pilot rings 106, 108 of the plunger 54, aligned with the groove 100 in the plunger 54, and is arranged to engage a limit surface 126 that may be defined by a surface of one of the pilot rings (shown as the second pilot ring 108).

In at least some implementations, the blocking surface 120 is arranged to prevent removal of the plunger 54 from the housing 37 but without interfering with the full range of movement of the plunger 54 in the actuated and deactuated states of the actuator. Thus, the retaining body 124 and its blocking surface 120 prevent removal of the plunger 54 from the housing 37 but do not interfere with a full range of movement of the plunger 54 during operation of the differential, when the differential is fully assembled and in use. That is, in at least some implementations, the limit surface 126 does not engage the blocking surface 120 when the plunger 54 moves between its first position and second position.

In the example shown in FIG. 9, the retaining body 124 is a partially annular ring, such as a circlip, c-clip or snap ring, that is received partially within the groove 122 and which is carried by the differential housing 37 (e.g. carried in or by the annular surface 79 over which the plunger 54 moves in use). The retaining body 124 may have an inner diameter larger than the diameter of the groove 122 enabling compression of the retaining body 124 in the groove 122 as the plunger 54 is installed and slid over the retaining body 124. The retaining body 124 is resilient and returns to it uncompressed state after the plunger is installed. In the example shown in FIG. 10, the retaining body 124' is a polymeric ring, such as an O-ring that is received partially within the groove 122 and which is carried by the differential housing 37 (e.g. carried in or by the annular surface 79 over which the plunger 54 moves in use).

In at least some implementations, when the plunger is in contact with the clutch ring, a distance between the limit surface 126 and blocking surface 120 may be less than the axial dimension of the first pilot ring 106, or otherwise arranged to prevent the first pilot ring 106 from moving axially off the housing surface 79. The radially overlapped limit surface 126 of the plunger 54 and blocking surface 120 of the retaining body 124, 124' can retain the plunger 54 in a desired assembled position, even without a bearing 88 or other component needed to limit movement of the plunger. For example, a separate retaining ring or washer is not needed to be installed on the housing to temporarily retain the plunger 54 until the bearing 88 is installed.

A retaining body for a plunger has a blocking surface that limits movement of the plunger in a direction in which the plunger is removed from the differential housing. The retaining body may be included as part of or defined by a housing of the actuator coil, or a body carried by the differential housing. Full movement of the plunger is permitted between its first and second positions when the actuator is actuated and deactuated, but removal of the plunger is prevented by engagement of a plunger limit surface with the blocking surface. In at least some implementations, the plunger 54 can move fully to and between its first and second positions without contact between the limit surface and blocking surface. In at least some implementations, contact between the limit surface and blocking surface may define either the first position or second position of the plunger.

Although the above descriptions relate to a locking differential device, other rotary power transmission devices, such as power take-off units or axle disconnects, could utilize a clutch with an actuator as described herein. In this regard, the power transmission device may include multiple rotating components, like gears and/or shafts, with the clutch and actuator used to selectively couple together at least two of the components to, for example, change a torque flow path through the device. Further, the forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. A rotary power transmission device, comprising:
a housing having an interior in which multiple components are received for rotation, and wherein the housing has an annular surface;
a clutch received within the housing and having a clutch ring selectively engageable with one of said multiple components;
an actuator having a coil and a plunger driven for movement along an axis and relative to the clutch, the plunger being received over and movable along the annular surface, and the plunger having a limit surface; and
a retaining body having a blocking surface radially overlapped with the limit surface and arranged to be contacted by the limit surface to prevent removal of the plunger from the annular surface, and wherein the retaining body is carried by and extends radially outward of the annular surface, wherein the housing includes a groove located in a portion of the annular surface over which the plunger is received and movable along and the groove extends radially inwardly into the housing from said portion of the annular surface, and the retaining body is an at least partially annular body that is partially received within the groove and extends out of the groove radially beyond the annular surface.

2. The device of claim 1 wherein the coil is received within a coil housing and the blocking surface is defined by a surface of the coil housing.

3. The device of claim 2 wherein the blocking surface is defined by a radially inwardly extending projection of the coil housing.

4. The device of claim 3 wherein the projection is axially overlapped by the coil.

5. The device of claim 3 wherein the projection is axially offset from the coil.

6. The device of claim 3 wherein the blocking surface is located radially inwardly of the coil.

7. The device of claim 6 wherein the blocking surface defines a radially inwardmost surface of the coil housing.

8. The device of claim 1 wherein the plunger has a first position in which the clutch ring is not engaged with said one of the multiple components, and the plunger has a second position in which the clutch ring is engaged with said one of the multiple components, and wherein the engagement of the limit surface with the blocking surface limits movement of the plunger in a direction in which the plunger moves away from the second position.

9. The device of claim 1 wherein the plunger includes a first body and a second body that are coupled together, the second body includes a radially inner surface that slides along the annular surface as the plunger moves along the annular surface and a portion of the second body is received radially between the first body and the annular surface, and wherein the limit surface is defined by the second body.

10. The device of claim 1 wherein the plunger includes a first body and a second body that are coupled together, the second body includes a radially inner surface that slides along the annular surface as the plunger moves along the annular surface and a portion of the second body is received radially between the first body and the annular surface, and wherein the limit surface is defined by the first body at a rear end of the plunger that is opposite to a front end of the plunger wherein the front end of the plunger is engageable with the clutch ring.

11. A rotary power transmission device, comprising:
a housing having an interior in which multiple components are received for rotation, and wherein the housing has an annular surface;
a clutch received within the housing and having a clutch ring selectively engageable with one of said multiple components;
an actuator having an annular wire coil and a plunger driven for movement along an axis and relative to the clutch, the plunger being received over and movable along the annular surface between a first position in which the clutch ring is not engaged with said one of said multiple components and a second position in which the clutch ring is engaged with said one of said multiple components, and the plunger having a radially extending limit surface; and a retaining body having a blocking surface radially overlapped with the limit surface and arranged to be contacted by the limit surface when the plunger is in the first position, and wherein a groove is provided that extends radially inwardly into the housing from in a portion of the annular surface over which the plunger is received, and the retaining body is an at least partially annular body that is partially received within the groove and extends out of the groove radially beyond the annular surface.

12. The device of claim 11 wherein the wire coil is received within a coil housing and the blocking surface is defined by a surface of the coil housing.

13. The device of claim 12 wherein the blocking surface defines a radially inwardmost surface of the coil housing.

14. The device of claim 11 wherein the groove extends along only a portion of an axial length of the annular surface.

15. A rotary power transmission device, comprising:
a housing having an interior in which multiple components are received for rotation, and wherein the housing has an annular surface;
a clutch received within the housing and having a clutch ring selectively engageable with one of said multiple components;
an actuator having an annular wire coil and a plunger driven for movement along an axis and relative to the clutch, the plunger being received over and movable along the annular surface between a first position in which the clutch ring is not engaged with said one of said multiple components and a second position in which the clutch ring is engaged with said one of said multiple components, and the plunger having a radially extending limit surface; and
a retaining body having a blocking surface radially overlapped with the limit surface and arranged to be contacted by the limit surface when the plunger is in the first position, and wherein a groove is provided that extends radially inwardly into the housing from the annular surface, and the retaining body is an at least partially annular body that is partially received within the groove and extends out of the groove radially beyond the annular surface, wherein the retaining body is radially overlapped by the plunger when the plunger is in both the first position and the second position.

16. The device of claim 15 wherein the plunger includes a radially inner surface received on the annular surface, and the radially inner surface is defined at least in part by a first pilot ring and a second pilot ring that is axially spaced from the first pilot ring, and wherein the retaining body is received between the first pilot ring and the second pilot ring.

17. The device of claim 16 wherein the retaining body engages the first pilot ring in the first position of the plunger, and the retaining body engages the second pilot ring in the second position of the plunger.

* * * * *